(12) United States Patent
Chou et al.

(10) Patent No.: US 7,055,985 B2
(45) Date of Patent: Jun. 6, 2006

(54) LIGHT SOURCE ASSEMBLY OF A BACKLIGHT MODULE

(75) Inventors: Chin-Wen Chou, Taipei Hisen (TW); Eddie Cheng, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 123 days.

(21) Appl. No.: 10/758,045

(22) Filed: Jan. 16, 2004

(65) Prior Publication Data

US 2005/0157494 A1     Jul. 21, 2005

(51) Int. Cl.
*F21S 4/00*     (2006.01)
(52) U.S. Cl. ............... 362/225; 362/252; 362/260
(58) Field of Classification Search ............ 362/225, 362/217, 219, 29–30, 221, 800, 84, 613–614, 362/561; 349/62, 64–65, 67, 70
See application file for complete search history.

(56) References Cited

U.S. PATENT DOCUMENTS

| | | | | |
|---|---|---|---|---|
| 4,766,524 A | * | 8/1988 | Ogawa et al. ............... 362/29 |
| 5,479,328 A | * | 12/1995 | Lee et al. ................... 362/216 |
| 5,755,507 A | * | 5/1998 | Hucks ......................... 362/219 |
| 5,975,722 A | * | 11/1999 | Van Duijneveldt .......... 362/296 |
| 6,039,451 A | * | 3/2000 | Grave ......................... 362/29 |
| 6,431,726 B1 | * | 8/2002 | Barton ......................... 362/220 |
| 6,639,349 B1 | * | 10/2003 | Bahadur ...................... 313/483 |
| 6,674,250 B1 | * | 1/2004 | Cho et al. .................... 315/291 |
| 6,709,122 B1 | * | 3/2004 | Adachi et al. ................ 362/27 |
| 6,857,759 B1 | * | 2/2005 | Lee et al. ..................... 362/225 |
| 6,939,020 B1 | * | 9/2005 | Lim ............................. 362/97 |
| 2004/0174333 A1 | * | 9/2004 | Kim et al. ................... 345/102 |

FOREIGN PATENT DOCUMENTS

JP     02272485 A   * 11/1990

* cited by examiner

*Primary Examiner*—John Anthony Ward
*Assistant Examiner*—Robert May
(74) *Attorney, Agent, or Firm*—Birch, Stewart, Kolasch & Birch, LLP

(57) ABSTRACT

A light-source assembly of a backlight module provides light sources to a liquid crystal display. The light-source assembly of the backlight module includes a bottom plate, a driving circuit board and a plurality of light-emitting elements. The driving circuit board is disposed in the middle of the bottom plate. The light-emitting element has two electrodes disposed at two ends of the light-emitting element and a uniform light section disposed on a tube body of the light-emitting element, wherein the electrodes of the light-emitting elements are respectively interlaced and connected to the driving circuit board. Simultaneously the uniform light portions are expanded to two sides of the driving circuit board outside, and the uniform light portion of the adjacent light-emitting elements located at the driving circuit board are also interlaced in parallel.

5 Claims, 4 Drawing Sheets

LIGHT SOURCE ASSEMBLY OF A BACKLIGHT MODULE

FIELD OF THE INVENTION

The present invention relates to a light source assembly of a backlight module, and more particularly to a light source assembly of a backlight module for large-sized liquid crystal displays.

BACKGROUND OF THE INVENTION

Recently, a liquid crystal display has light weight, flat panel display and low power consumption. The liquid crystal display also has low electromagnetic radiation to reduce the damage to the human body. Thus, liquid crystal displays are widely applied to many types of display devices. However, liquid crystals cannot emit light by themselves, and therefore the liquid crystal display must be equipped with a back module to project light sources. Conventional liquid crystal displays include an "upper/lower type" light source arrangement (For edge lighting, four lights are typically used, two upper light tubes and two lower tubes. If there are six, then the same arrangement applies; three above and three below) or a backlight module with "direct type" light source.

According to the light-emitting elements of typical liquid crystal display with large dimensions, two light-emitting elements need to be connected to each other to meet the required length. Typical light-emitting devices are too long, and therefore if the light-emitting device has any problems it is not easy to fix during assembly. Furthermore, the light-emitting device is not easy to manufacture, and therefore the elements of light-emitting devices are not easily made or replaced and the production cost is high. In addition, the light-emitting devices with extra length need higher driving voltages during use, and therefore the light-emitting device has a further problem of manufacture.

Referring to FIG. 1 in the prior art, depicts a backlight module of a conventional liquid crystal display, whose size is larger than 17 inches. A bottom plate 10 and a driving circuit board 11 should become larger, and also light tubes should be connected to each other to increase the length of the light tube and the light-emitting square measure in the arrangement. The light tube is a light-emitting element 12, such as cold cathode fluorescent lamps (CCFL), which has two electrodes 121 disposed at two ends of the light-emitting element 12, and a uniform light section 122 disposed in the middle of the light-emitting element 12. Typically, the composition of the backlight module is shown in FIG. 1 in the prior art, the brightness of the driving circuit board 11 is less than another area of the backlight module in the application because the brightness of the electrodes 121 portion is less than that of the uniform light section 122. In other words, the whole brightness is not uniform, i.e., the location of the electrodes 121 is not suitable as the light-emitting source of a backlight module.

Accordingly, there exists a need for a light source assembly of a backlight module to solve the above-mentioned problems and disadvantages.

SUMMARY OF THE INVENTION

It is an object of the present invention to provide a driving circuit board connected to a light-emitting device, and therefore the light-emitting device can become longer in length. Thus, it solves a problem that the above-mentioned liquid crystal display with large dimensions needs a long light-emitting device. It also utilizes a currently typical light-emitting device and driving device to achieve the necessary light resource assembly of the backlight module with large dimensions.

It is another object of the present invention that the electrodes and uniform light sections of the adjoining light-emitting device located at the driving circuit board are interlaced in parallel, whereby the brightness of the location of the electrodes located at the driving circuit board is similar to that of the uniform light portion and furthermore the backlight module has a uniform light-emitting resource.

In order to achieve the foregoing objectives, the present invention provides a light resource assembly of a backlight module providing light sources to a liquid crystal display. The light source assembly of the backlight module includes a bottom plate, a driving circuit board and a plurality of light-emitting elements. The driving circuit board is disposed at a middle of the bottom plate. The light-emitting element has two electrodes disposed at two ends of the light-emitting element and a uniform light portion disposed on the tube body of the light-emitting element, wherein the electrodes of the light-emitting elements are respectively interlaced and connected to the driving circuit board. Simultaneously the uniform light sections are expanded on two sides of the driving circuit board outside so as to increase the length of the light-emitting element. The uniform light section of the adjoining light-emitting elements located on the driving circuit board are also interlaced in parallel, whereby the brightness of the location of the electrodes located at the driving circuit board is similar to that of the uniform light portion and further the backlight module has whole uniform light-emitting resource.

Furthermore, the light-emitting elements can be cold cathode fluorescent lamps (CCFL) or light emitting diode (LED). The shape of light-emitting element can be a straight tube, a U-shaped tube or a W-shaped tube.

The foregoing, as well as additional objects, features and advantages of the invention will be more readily apparent from the following detailed description, which proceeds with reference to the accompanying drawings.

DESCRIPTION OF THE PREFERRED EMBODIMENTS

The detailed features and technical descriptions of the present invention will be explained with reference to the preferred embodiments as follows.

Figure 1:
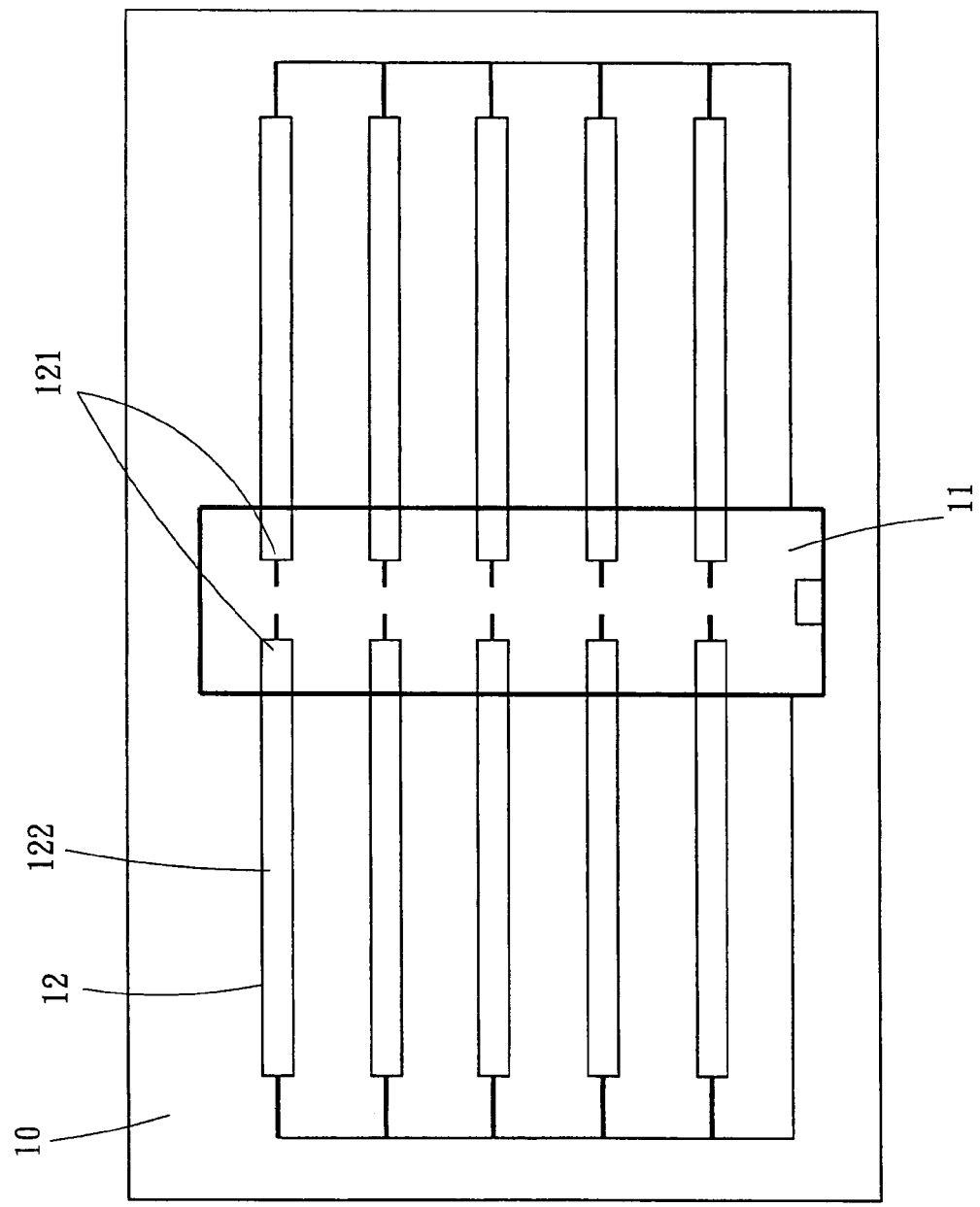
FIG. 1 is a schematic of a light source assembly of a backlight module in the prior art.
Figure 2:
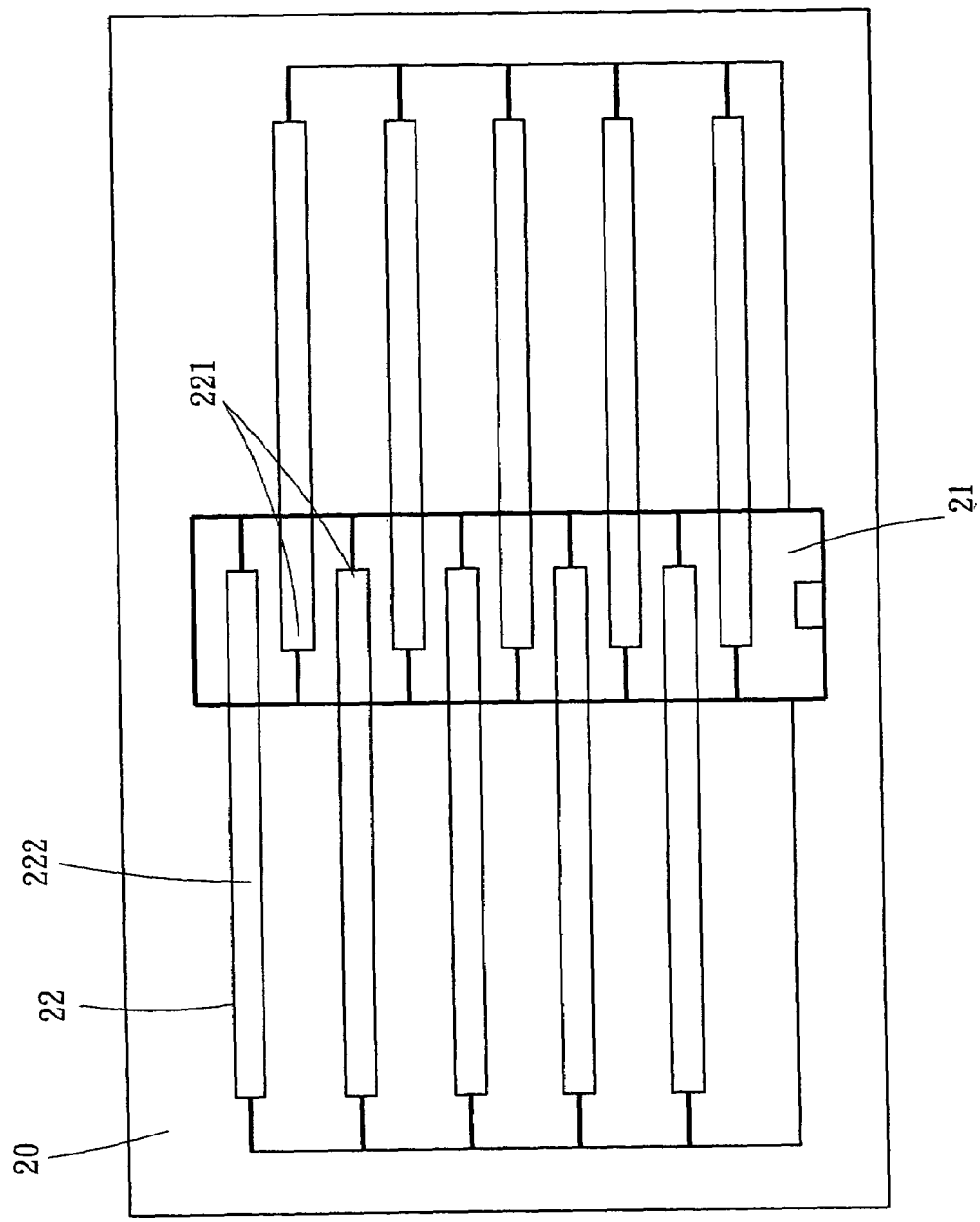
FIG. 2 is a schematic of a light source assembly of a backlight module according to a first embodiment of the present invention.

The First Embodiment:

Referring to FIG. 2, depicts the arrangement of a backlight module according to the first embodiment of the present invention. A light-emitting element 22 with a straight tube, and also used in the first embodiment. A light source assembly of the backlight module of the present invention includes a bottom plate 20, a driving circuit board 21 disposed at a middle of the bottom plate 20 and a plurality of straight-tube light-emitting elements 22. The light-emitting element 22 has two electrodes 221 disposed at two ends of the light-emitting element 22, and a uniform light section 222 disposed on a tube body of the light-emitting element 22. One of the electrodes 221 of the light-emitting elements 22 are respectively interlaced and connected to the above-mentioned driving circuit board 21, simultaneously the uniform light sections 222 are expanded on two sides of the driving circuit board 21, as shown in FIG. 2. When one of the light-emitting elements 22 is expanded to one side of the driving circuit board 21 outside, another adjacent one of the light-emitting elements 22 is expanded to the other side of the driving circuit board 21. Furthermore, the uniform light section 222 of the adjacent light-emitting elements 22 located at the driving circuit board 21 are also interlaced in parallel, whereby the brightness of the location of the electrodes 221 located on the driving circuit board 21 is similar to that of the uniform light section 222 and further the backlight module has whole uniform light-emitting resource.

As described above, the present invent utilizes the driving circuit board 21 connected to a light-emitting device, and therefore the light-emitting device can become longer in length. Thus, it solves a problem that the above-mentioned liquid crystal display with large dimensions needs a long light-emitting device. It also utilizes a typical light-emitting device and driving device to achieve the necessary light source assembly of the backlight module with large dimensions.

Figure 3:
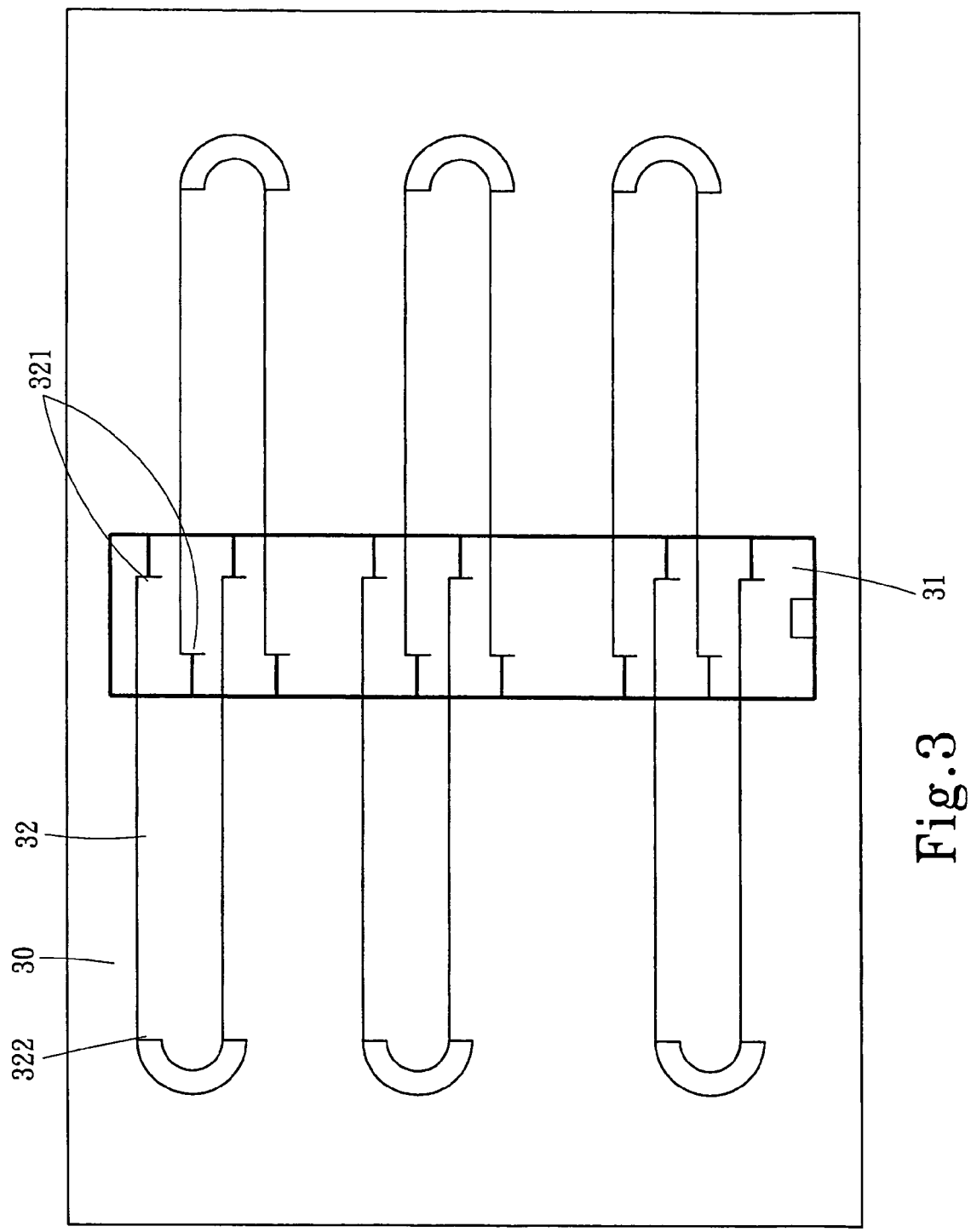
FIG. 3 is a schematic of a light source assembly of a backlight module according to a second embodiment of the present invention.

The Second Embodiment:

Referring to FIG. 3; depicts the arrangement of a backlight module according to the second embodiment of the present invention. A light-emitting element 32, a U-shaped tube is used in the second embodiment. A light source assembly of the backlight module of the present invention includes a bottom plate 30, a driving circuit board 31 disposed in the middle of the bottom plate 30 and a plurality of light-emitting elements 32 (U-shaped tubes). The light-emitting element 32 has two electrodes 321 disposed at two ends of the light-emitting element 32, and a uniform light section 322 disposed on a tube body of the light-emitting element 32. The two electrodes 321 of the light-emitting element 32 and the two electrodes 321 of the other light-emitting elements 32 are respectively interlaced and connected to the above-mentioned driving circuit board 31, simultaneously the uniform light portions 322 are expanded to two sides of the driving circuit board 31 outside, as shown in FIG. 3. Furthermore, the uniform light section 322 of the adjacent light-emitting elements 32 located at the driving circuit board 31 are also interlaced in parallel, whereby the brightness of the location of the electrodes 321 located at the driving circuit board 31 is similar to that of the uniform light section 322 and further the backlight module has whole uniform light-emitting resource.

Figure 4:
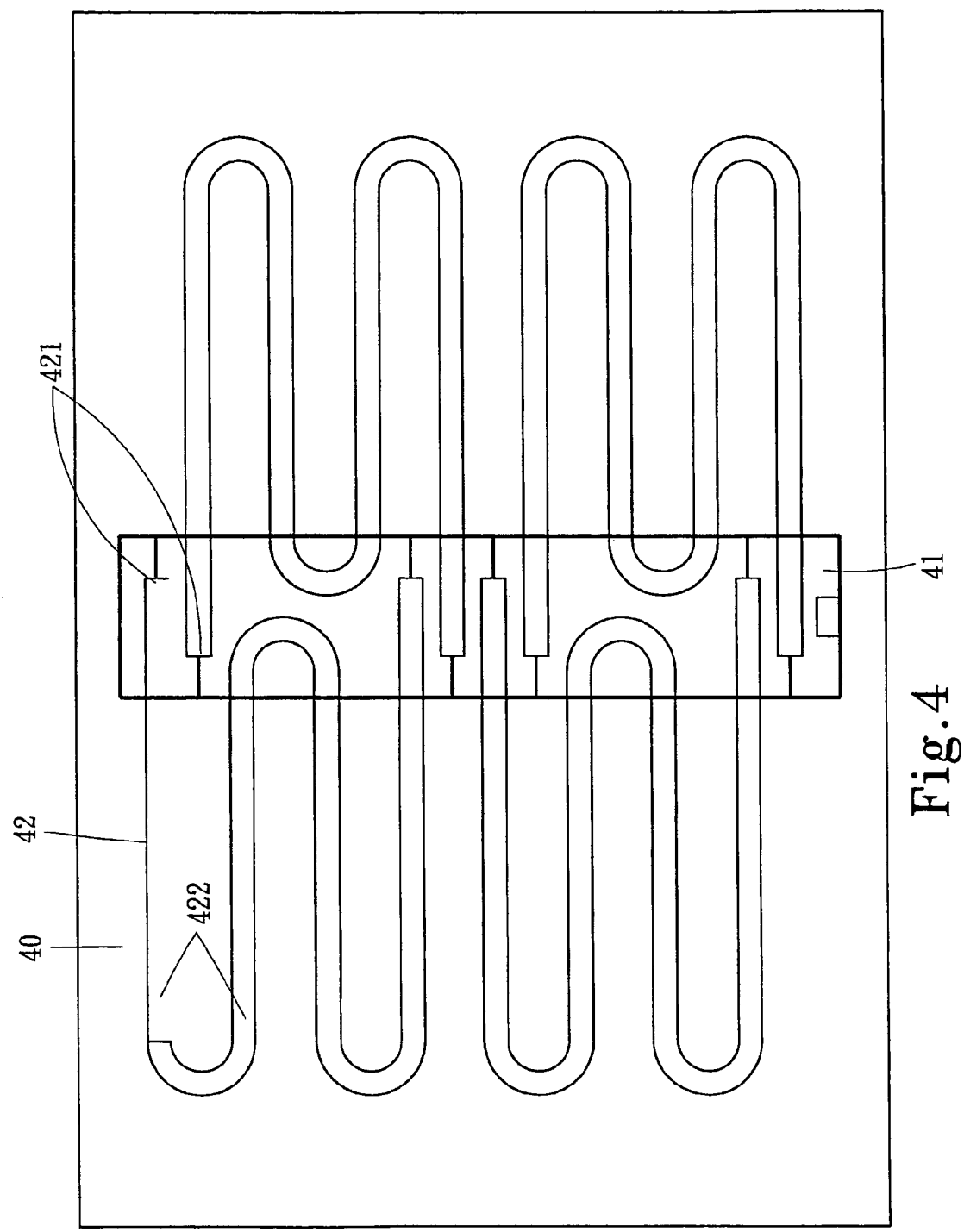
FIG. 4 is a schematic of a light source assembly of a backlight module according to a third embodiment of the present invention.

The Third Embodiment:

Referring to FIG. 4, it depicts an arrangement of a backlight module according to the third embodiment of the present invention. A light-emitting element 42 whose shape is W-shaped tube is used in the third embodiment that is similar to the second embodiment. A light source assembly of the backlight module of the present invention includes a bottom plate 40, a driving circuit board 41 disposed in the middle of the bottom plate 40 and a plurality of W-shaped tubes, or light-emitting elements 42. The light-emitting element 42 has two electrodes 421 disposed at two ends of the light-emitting element 42, and a uniform light section 422 disposed on a tube body of the light-emitting element 42. The two electrodes 421 of the light-emitting element 42 and the two electrodes 421 of the another light-emitting elements 42 are respectively interlaced and connected to the above-mentioned driving circuit board 41, simultaneously the uniform light section 422 are expanded on two side of the driving circuit board 41, as shown in FIG. 4. Furthermore, the uniform light section 422 of the adjacent light-emitting elements 42 located at the driving circuit board 41 are also interlaced in parallel, whereby the brightness of the location of the electrodes 421 located at the driving circuit board 41 is similar to that of the uniform light section 422 and further the backlight module has whole uniform light-emitting resource.

As described above, the present invent utilizes the driving circuit board 41 connected to a light-emitting device, and therefore the light-emitting device can be made longer in length. Thus, it solves a problem that the above-mentioned liquid crystal display with large dimensions need a long light-emitting device. It also utilizes a currently typical light-emitting device and driving device to achieve the necessary light source assembly of the backlight module with large dimensions.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A light-source assembly of a backlight module for providing light source to a liquid crystal display, comprising:
   a bottom plate;
   a driving circuit board disposed in the middle of the bottom plate; and
   a plurality of light-emitting elements, each of the light-emitting elements having two electrodes disposed at two ends thereof and having a uniform light section disposed on a tube body thereof, the electrodes of the light-emitting elements being respectively interlaced and connected to the driving circuit board, the electrodes of adjacent light-emitting elements located at the driving circuit board respectively extending to two sides of the driving circuit board, the uniform light sections being expanded outside the two sides of the driving circuit board, the uniform light sections of the adjacent light-emitting elements located at the driving circuit board being interlaced in parallel.

2. The light-source assembly of a backlight module according to claim 1, wherein the light-emitting element is a cold cathode fluorescent lamp (CCFL).

3. The light-source assembly of a backlight module according to claim 1, wherein the shape of light-emitting element is a straight tube.

4. The light-source assembly of a backlight module according to claim 1, wherein the light-emitting element is a U-shaped tube.

5. The light-source assembly of a backlight module according to claim 1, wherein light-emitting element is a W-shaped tube.

* * * * *